(12) United States Patent
Corsi Henson

(10) Patent No.: US 11,005,415 B2
(45) Date of Patent: May 11, 2021

(54) SOLAR SHADE STRUCTURE

(71) Applicant: Jesse Wolf Corsi Henson, Phoenix, AZ (US)

(72) Inventor: Jesse Wolf Corsi Henson, Phoenix, AZ (US)

( * ) Notice: Subject to any disclaimer, the term of this patent is extended or adjusted under 35 U.S.C. 154(b) by 0 days.

(21) Appl. No.: 16/548,095

(22) Filed: Aug. 22, 2019

(65) Prior Publication Data
US 2020/0067449 A1    Feb. 27, 2020

Related U.S. Application Data

(60) Provisional application No. 62/721,691, filed on Aug. 23, 2018.

(51) Int. Cl.
*H02S 20/10* (2014.01)
*H02S 20/23* (2014.01)
*E04H 6/02* (2006.01)
*B60L 53/51* (2019.01)

(52) U.S. Cl.
CPC ............. *H02S 20/23* (2014.12); *E04H 6/025* (2013.01); *B60L 53/51* (2019.02); *H02S 20/10* (2014.12)

(58) Field of Classification Search
CPC ... E04H 6/025; E04C 3/00; E04C 3/02; E04B 7/022; E04B 7/024
See application file for complete search history.

(56) References Cited

U.S. PATENT DOCUMENTS

| 3,959,945 | A  | * | 6/1976 | Allen | E04B 7/022 52/690 |
| 8,984,817 | B2 | * | 3/2015 | Weiden | F16C 33/201 52/173.3 |
| 9,765,520 | B2 | * | 9/2017 | Armbrust | E04C 3/08 |
| 10,072,416 | B2 | * | 9/2018 | Armbrust | E04B 1/2403 |
| 2007/0113511 | A1 | * | 5/2007 | Greiner | E04B 5/10 52/633 |
| 2008/0134588 | A1 | * | 6/2008 | Knight | E04B 7/24 52/66 |

(Continued)

FOREIGN PATENT DOCUMENTS

| CA | 2389254 A1 | * | 5/2001 | ............. E04H 6/025 |
| DE | 102006022217 A1 | * | 11/2007 | ............. E04H 6/025 |

(Continued)

*Primary Examiner* — Babajide A Demuren
(74) *Attorney, Agent, or Firm* — Woods Oviatt Gilman LLP; Ronald J. Kisicki, Esq.

(57) ABSTRACT

A shade structure assembly includes at least one column member. A horizontal beam is secured at a top end of the column member. A first rail is secured to a first end and a second rail is secured to a second end of each horizontal beam. At least one truss assembly is secured to the rails. The truss assembly includes at least two truss members arranged in spaced parallel relation. Structural supports connect the truss members along two of the truss beams and panel supports connect the truss members along two of the truss beams. The panel supports mount a panel array. Each truss member may comprise a center truss portion and one or both of a first and second truss extension. Each truss member may be comprised of a universal center truss portion and one or both of a first and second truss extension.

20 Claims, 8 Drawing Sheets

(56) References Cited

U.S. PATENT DOCUMENTS

| | | | | |
|---|---|---|---|---|
| 2009/0223142 A1* | 9/2009 | Shingleton | ............ | F24S 20/67 52/71 |
| 2011/0290305 A1* | 12/2011 | Hoffmann | ............ | H02S 20/23 136/251 |
| 2012/0291374 A1* | 11/2012 | Zante | ............ | F24S 25/70 52/173.3 |
| 2013/0098858 A1* | 4/2013 | Cusson | ............ | A47B 47/00 211/189 |
| 2013/0180568 A1* | 7/2013 | Hartelius | ............ | H02S 20/10 136/246 |
| 2013/0263913 A1* | 10/2013 | Almy | ............ | H02S 30/20 136/245 |
| 2014/0020308 A1* | 1/2014 | Heisler | ............ | E04B 7/022 52/90.1 |
| 2018/0041159 A1* | 2/2018 | DeBartolo, III | ............ | G06Q 99/00 |
| 2020/0036325 A1* | 1/2020 | Poivet | ............ | G05D 3/105 |

FOREIGN PATENT DOCUMENTS

| | | | | |
|---|---|---|---|---|
| DE | 102010018917 A1 * | 12/2010 | ............ | E04H 6/025 |
| DE | 102012104663 A1 * | 12/2013 | | |
| EP | 1696087 A1 * | 8/2006 | ............ | E04H 6/025 |
| EP | 3101193 B1 * | 12/2018 | ............ | E04C 3/005 |
| FR | 2944042 B1 * | 5/2015 | ............ | F24S 20/67 |
| FR | 3014925 A1 * | 6/2015 | | |

\* cited by examiner

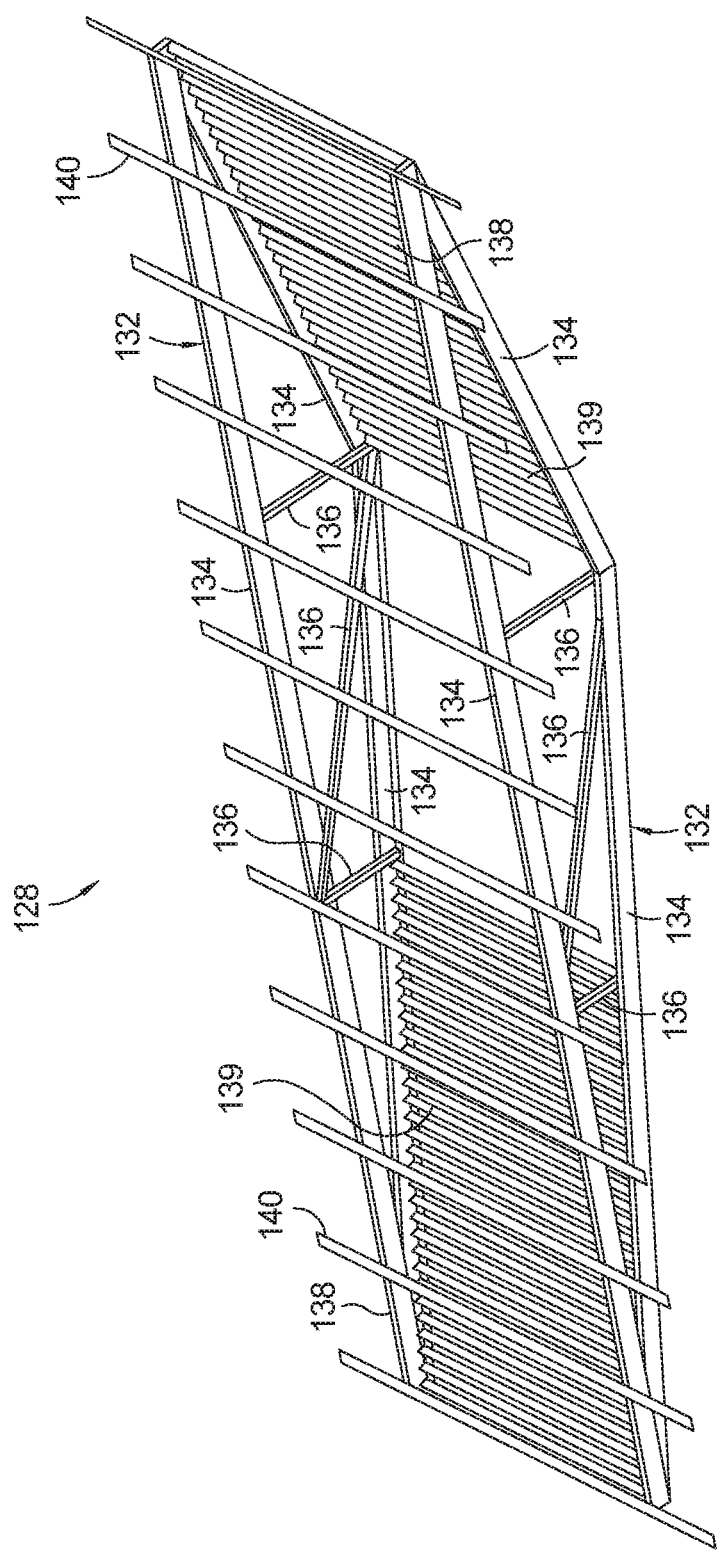

SOLAR SHADE STRUCTURE

CROSS-REFERENCE TO RELATED APPLICATIONS

This application claims the benefit of U.S. Provisional Patent Application No. 62/721,691, filed Aug. 23, 2018, entitled SOLAR SHADE STRUCTURE, the entirety of which is incorporated herein by reference.

FIELD OF THE INVENTION

The present invention relates to a shade structure, and more particularly to a shade structure incorporating solar photovoltaic modules, and still more particularly to a shade structure for use in a parking lot or as a seating area for pedestrians.

BACKGROUND OF THE INVENTION

Solar shade structures in use today typically provide shade and electricity generation. However, the current state of the art of construction of such structures, misses the opportunity to pre-engineer and pre-fabricate and as a result each solar shade structure is typically custom identified, engineered, and fabricated on-site. Whether a large or small installation of solar canopy structures, the typical process identifies the length, width, and height of each canopy in a sales proposal for each potential parking lot and pedestrian area, then those same solar canopy structures are evaluated by a licensed engineer for structural code conformance and submitted to the authority having jurisdiction (AHJ) for a building permit. Once the design is approved by the AHJ, the structural components must be custom shop fabricated, assembled, and erected on-site for a complete installation. And furthermore the electrical system design of each solar canopy structure must be individually evaluated for electrical code conformance and good solar energy production. Once the design process is complete and the construction process begins, the typical solar shade structures do not incorporate pre-fabricated assemblies and instead each solar shade structure is custom built on-site with individual structural members. These individual structural members are often the only pre-fabricated elements of current solar canopy structures. For example the typical supporting steel purlins and beams are fabricated to precisely work for the specific solar canopy structure length, width, and height having a quantity of solar photovoltaic modules with a specific length, width, and height having no additional dimensional tolerance for different configurations or module sizes. The resulting cost of the design process and capital investment in the solar canopy structures yields a substantial financial barrier to property owners for installing such solar canopy structures. In addition such solar canopy structures typically are permanently installed in such a manner so as to make disassembly, relocation, and reuse virtually impossible. Again the permanent installed nature of such solar canopy structures in parking lots and pedestrian areas creates a disincentive for property owners who must maintain flexibility of land use for the purpose of constructing permanent enclosed structures (buildings).

The invention proposes to standardize design of solar canopies/shade structures, as well as, the structural and electrical engineering of the solar shade structures owing to the fact that discrete building blocks can be pre-engineered, pre-fabricated, and pre-approved to meet regulatory/code standards. To further elaborate, the potential solar and shade benefits, as well as, costs of the solar shade structures can be quickly quantified and understood through the use of pre-designed discrete building blocks overlaid onto satellite photographs or other planning mechanisms. During the design and engineering phase, the use of pre-designed discrete building blocks can flexibly adapt to individual site characteristics and constraints with various planning layouts. Once energy outputs and costs are established, a customer can then approve a set of design documents and obtain AHJ approval. This task is made much quicker and easier through the use of pre-designed and pre-engineered standard solar shade structure assembly elements. Pre-engineered standard solar shade structure assembly elements can be pre-fabricated, transported to the project site, constructed and installed while accommodating and adapting to the individual site characteristics and constraints without need of re-engineering and re-work. Post installation, these same standard solar shade structure assembly elements can be disassembled, relocated, and reused in the event there is a land use change or change in purpose requiring the removal of the solar shade structures.

The invention incorporates a variety of foundation assemblies to provide a range of solutions including permanent in-ground foundations, as well as, temporary above grade relocatable mass that resists wind uplift, seismic, gravity and other such structural forces. The invention can adapt to various application and site requirements by allowing the incorporation of in-ground structures such as columns and concrete piers and/or above grade mass such as shipping containers or similar. The capability of having standard foundation options is a further embodiment of the building block concept offered by the invention.

Currently there are commercial solutions that provide structures which deliver temporary power generation, or, temporary shade/shelter in an emergency situation, natural disaster, or similar event. The subject invention incorporates building blocks that can provide energy generation, energy storage, and shade in a single structure that can be easily assembled and disassembled. In addition the temporary power solution can assist with energy needs in non-emergency settings in order to support microgrids or similar community oriented electric utilities while also offering shade to further promote community focused gathering space.

Accordingly there is a need for a system which uses pre-fabricated standardized sub-structures that can be used as building blocks to assemble a final solar shade structure on-site and that can be selectively removed and/or upgraded to accommodate future advancements. The present invention fills these, as well as other, needs.

SUMMARY OF THE INVENTION

Briefly described, a shade structure assembly includes at least one column member arranged vertically with respect to the ground. When two or more column members are used, the members are spaced in parallel relation to one another. A respective horizontal beam is perpendicularly secured at a top end of the column member. Each respective horizontal beam has opposing first and second ends and a pair of rails is arranged in spaced parallel relation to one another. A first rail of the pair of rails is secured to the first end of each respective horizontal beam and a second rail of the pair of rails is secured to the second end of each respective horizontal beam. At least one truss assembly is secured to the pair of rails. The at least one truss assembly includes at least two truss members arranged in spaced parallel relation to one another. Each truss member comprises three or more truss beams. A plurality of structural supports connects the at least two truss members along two of the truss beams and a plurality of panel supports connect the truss members along two of the truss beams. The panel supports may also be used to mount a panel array thereon. Each truss member may also comprise three truss beams arranged to form an irregular triangle.

In accordance with a further aspect of the present invention, a shade structure assembly includes at least one column member arranged vertically with respect to the ground. When two or more column members are used, the members are spaced in parallel relation to one another. A respective horizontal beam is secured at a top end of the column member. Each respective horizontal beam has opposing first and second ends and a pair of rails is arranged in spaced parallel relation to one another with a first rail of the pair of rails secured to the first end of each respective horizontal beam and a second rail of the pair of rails secured to the second end of each respective horizontal beam. At least one truss assembly is secured to the pair of rails. The at least one truss assembly includes at least two truss members arranged in spaced parallel relation to one another. Each truss member comprises three or more truss beams. A plurality of structural supports connects the truss members along two of the truss beams and a plurality of panel supports connects truss members along two of the truss beams. A panel array is mounted to the panel supports. The panel array may include one of more photovoltaic panel members. Each truss member may also comprise three truss beams arranged to form an irregular triangle.

DESCRIPTION OF THE DRAWINGS

FIG. 3 is an isolated view of a truss assembly used with the embodiment of a solar shade structure shown in FIG. 1;

Corresponding reference characters indicate corresponding parts throughout the several views. The exemplifications set out herein illustrate currently preferred embodiments of the invention, and such exemplifications are not to be construed as limiting the scope of the invention in any manner.

DESCRIPTION OF ENABLING EMBODIMENTS

Figure 1:
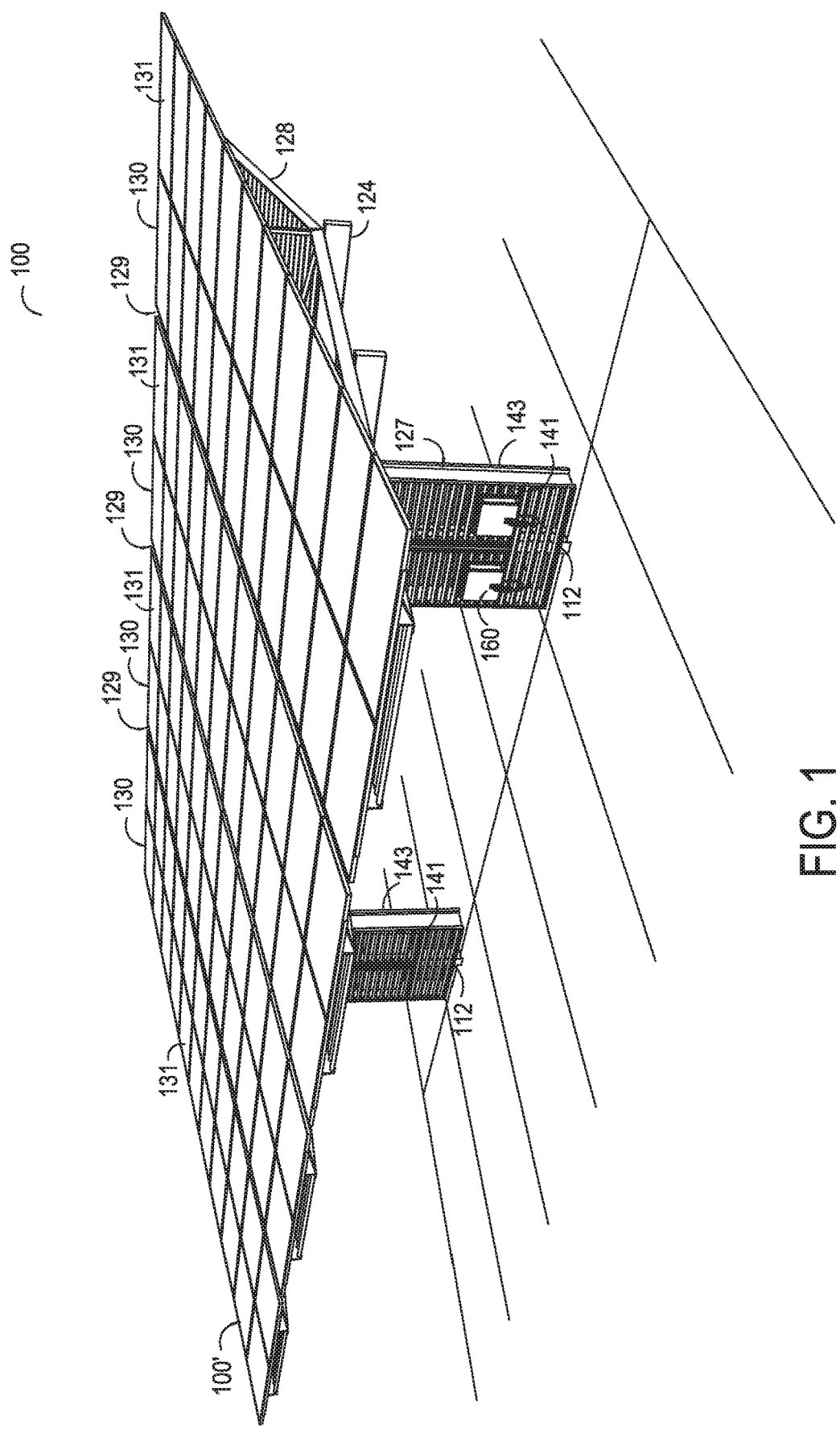
FIG. 1 is a perspective view of an embodiment of a solar shade structure in accordance with an aspect of the present invention.
Figure 2:
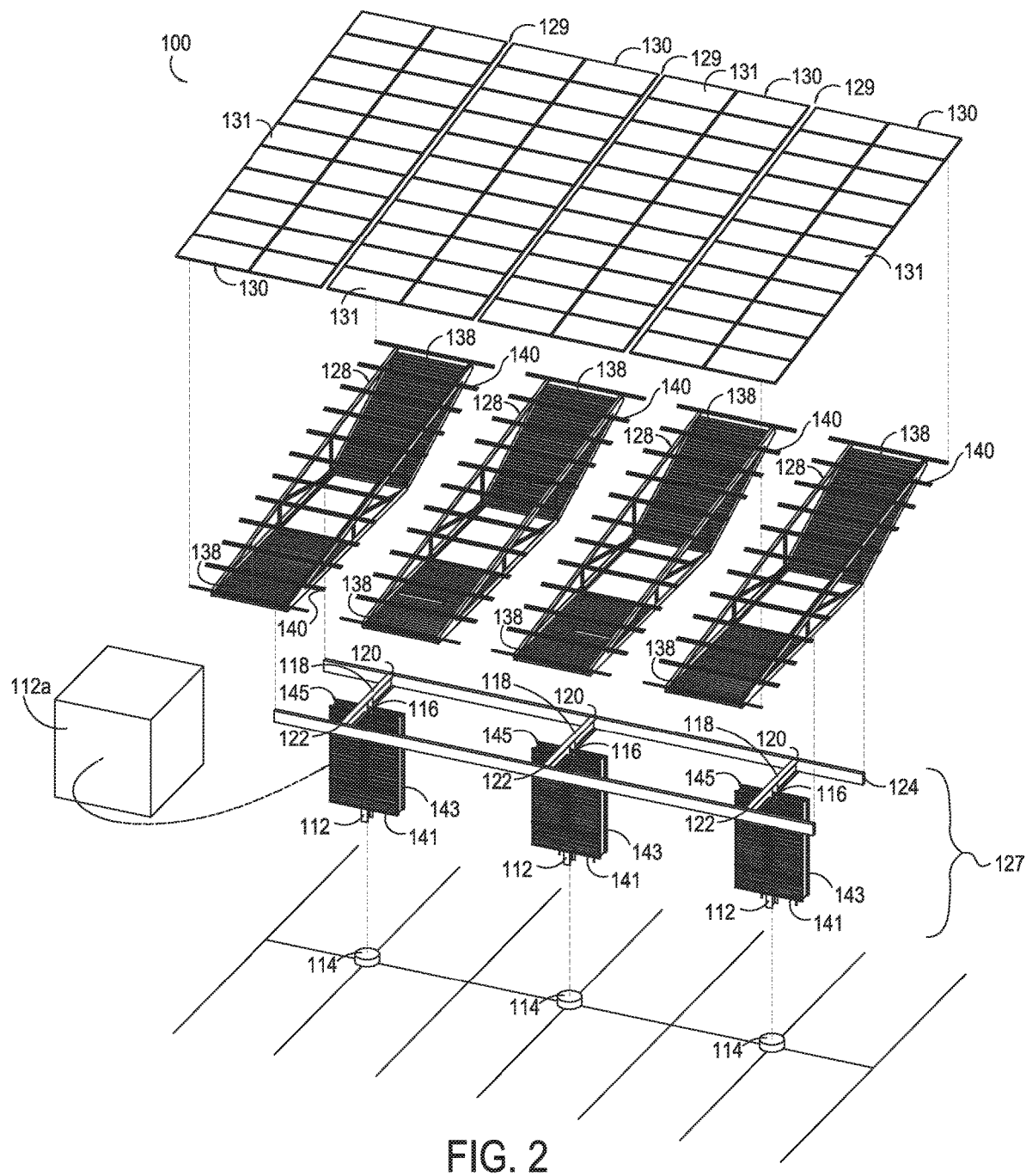
FIG. 2 is an exploded view of the embodiment of a solar shade structure shown in FIG. 1.

With reference to FIGS. 1 and 2, there is shown an embodiment of a modular shade structure assembly 100 in accordance with an aspect of the present invention. Assembly 100 generally comprises one or more column members 112 arranged vertically with respect to the ground. Column member 112 may be secured directly within the ground, such as via a post hole filled with concrete or, more preferably, anchored to a concrete footing 114 (FIG. 2) as is known in the art. Optionally, column member 112a may be a provided as an above-grade mass shipping container or the like, that is not secured directly within the ground, making the structure readily disassemble-able for use in temporary installations. Preferably, portable column member 112a would be selected to adequately resist wind uplift, seismic, gravity and other potential forces imposed on the structure.

Perpendicularly mounted at the top end 116 of column member 112/112a is a horizontal beam 118 having first and second ends 120, 122. A pair of rails 124, 126 is arranged in spaced parallel relation to one another with first rail 124 secured to first end 120 of each horizontal beam 118, while second rail 126 is secured to second end 122 of each horizontal beam 118. Column member 112/112a, horizontal beam 118 and rails 124, 126 (along with footing 114, when included) form a standardized mounting substructure 127. A plurality of truss assemblies 128 may then be mounted along rails 124, 126. Truss assemblies 128 are configured to mount a plurality of panel arrays 130 thereon. Without limitation thereto, each panel array 130 may include one or more photovoltaic (PV) panels 131. Other possible panel compositions include metal roofing and glass/plastic panels having a range of visual and optical qualities from opaque, to translucent, to transparent, with and without custom colors or designs.

As shown in FIGS. 4A-4E and as will be discussed in greater detail below, truss assemblies 128 may be configured and oriented in a number of ways so as to be selectively mountable onto a common mounting substructure 127 depending upon such things as size and space considerations, the cardinal orientation of the installed shade structure assembly 100, and other practical and/or aesthetic considerations. It should be noted that, while four truss assemblies 128 are shown in FIGS. 1 and 2, any number of truss assemblies may be used as desired or as determined by structure assembly length or on-site demands. Additionally, a gap 129 may be located between adjacent panel arrays 130. The size of gap 129 may be variable according to the site where the solar shade structure is built. In this manner, gap 129 may provide flexibility to adjust the total length of shade structure assembly 100, as well as provide for easy removal of one or more panel arrays 130 or individual PV modules for maintenance, replacement or upgrade. Additional, provision of gap 129 may allow truss assemblies 128 to be mounted in different orientations with respect to each other during installation.

With additional reference to FIG. 3, each truss assembly 128 may include two or more truss members 132 arranged in spaced parallel relation to one another. As exemplified in FIGS. 4A-4E, and discussed in greater detail below, each truss member 132 may be comprised of three or more truss beams 134 and may include additional bracing members 136a, 136b, 136c. Turning again to FIG. 3, a plurality of structural supports 138 may connect adjacent truss members 132 along respective adjacent truss beams 134. Additionally, a plurality of panel supports 140 may connect truss members 132 along two of truss beams 134. Structural supports 138 may also form a horizontal or sloped screen panel assembly that creates a tray 139 for hiding and securing electrical wiring and equipment used in conjunction with the PV modules of panel arrays 130. Tray 139 may also allow electrical wiring and equipment to be located in an easily identifiable space such that maintenance servicing may be more efficient.

Referring again to FIGS. 1 and 2, in accordance with another aspect of the present invention, shade structure assembly 100 may also include one or more screen panels 141, 143 arranged about column member 112. Opposing screen panels 141, 143 may create a space 145 there between that may be used to hide and secure electrical components the PV modules of panel arrays 130, such as DC/AC inverters, electrical disconnects, and electrical junction boxes. As with tray 139 formed by structural supports 138, screen panels 141, 143 may allow for more efficient maintenance servicing.

Figure 4A:
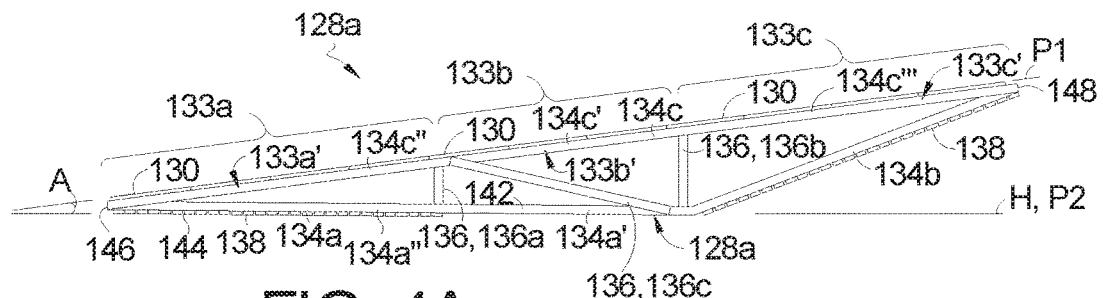
FIG. 4A-4E are side views of alternative truss assembly structures suitable for use within the embodiment of a solar shade structure shown in FIG. 1.
Figure 4B:
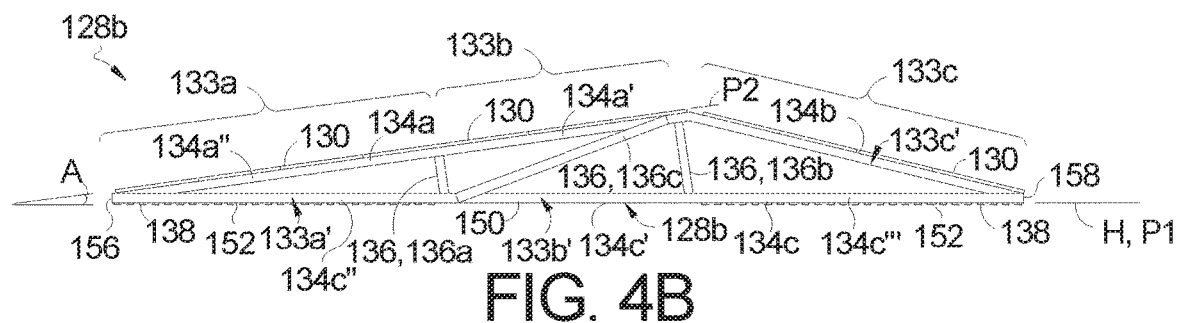
Figure 4C:
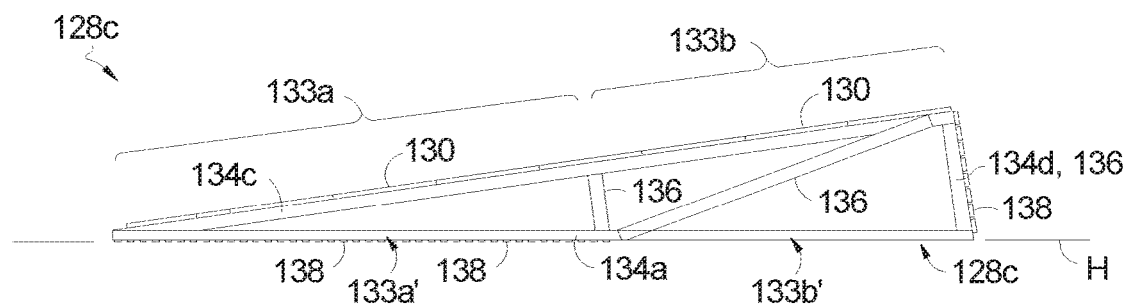
Figure 4D:
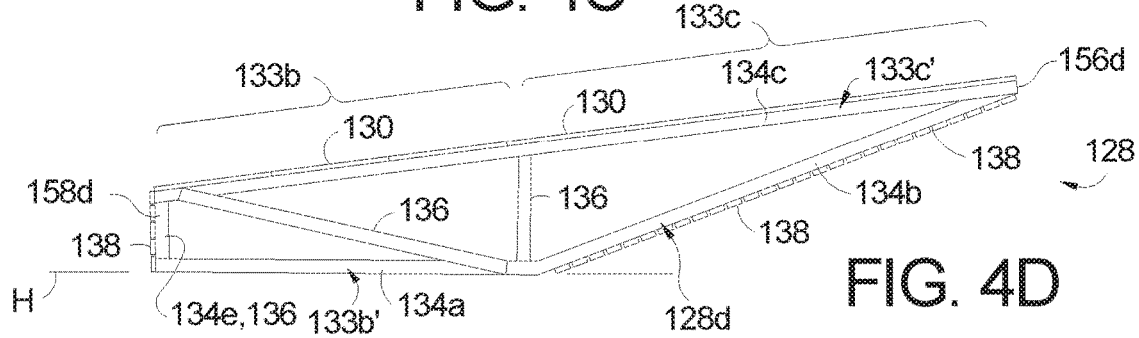
Figure 4E:
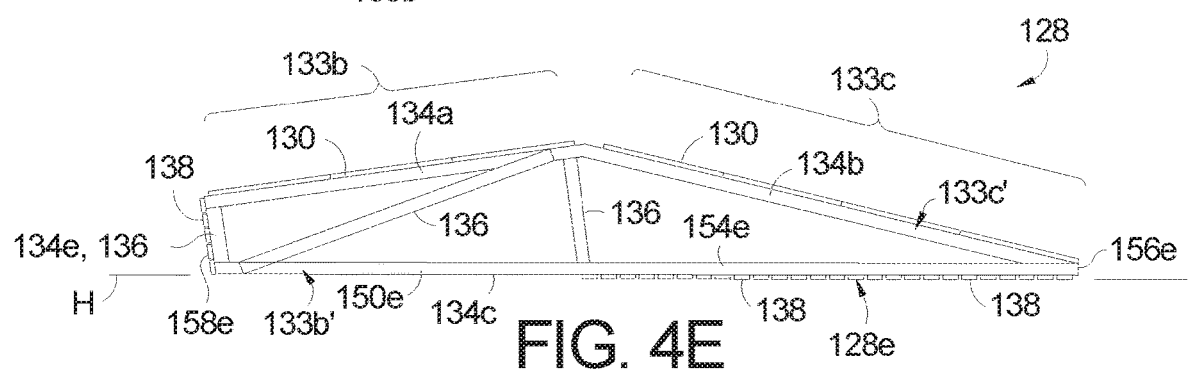

FIGS. 4A through 4E show non-limiting examples of various truss assembly configurations with differing structural support/panel support orientations that may be constructed using a center truss portion and a first and/or second truss extension as discussed below. FIGS. 4A and 4B may be suitable for shading a double row of cars as shown generally in FIGS. 1, 2 and 8 (assemblies 100'). In accordance with an aspect of the present invention, the truss assemblies may be modular constructions which may be fabricated off-site and delivered en masse to the installation location. To that end, a template truss assembly 128a and 128b (FIGS. 4A and 4B) may be arranged to define three distinct zones 133a, 133b and 133c comprised of a universal truss unit 133b' and a first and second truss extension units 133a', 133c'. As shown, three truss beams 134a, 134b, 134c may be arranged to form an irregular triangle which comprises zones 133a, 133b and 133c. As shown in FIGS. 4C through 4E, one or more of truss beams 134a, 134b, 134c may be omitted or truncated to form an irregular polygon which may further include a truss beam 134d or 134e comprised of a universal truss unit 133b' and a first or second truss extension units 133a,133c'.

Figure 10A:
FIG. 10A-10C are side views of the truss assemblies shown in FIGS. 4A and 4B showing manufacturing alternatives.
Figure 10B:
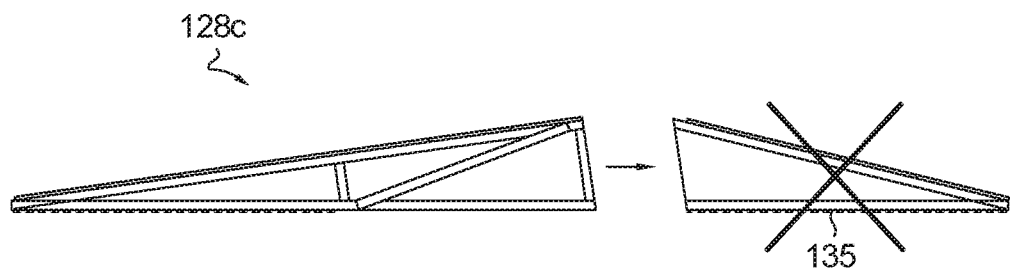
Figure 10C:
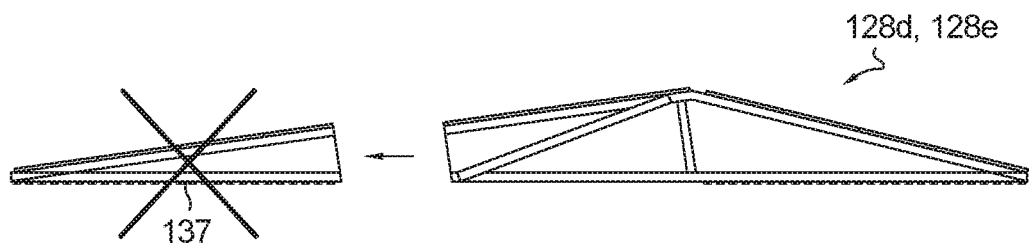

Once again, the truss assembly embodiments shown in FIGS. 4A-4E are only examples and, in no way, are meant to limit the invention. However, as further discussed below, the embodiments provided in FIGS. 4A-4E offer a distinct advantage by providing commonality in truss construction. Turning to FIGS. 10A-10C, in a standard fixture for constructing truss assembly 128a or 128b, by simply eliminating section 135 (FIG. 10B) or section 137 (FIG. 10C) from truss assembly 128a or 128b, respectively, truss assemblies 128c or truss assemblies 128d/128e may be formed on the same fixture.

In a further aspect of the present invention, the truss assemblies 128a-128e may comprise a universal truss unit 133b' comprising zone 133b and may include a first member 134c', a second member 134a', a first side member 136a and a second side member 136b. As can be seen in FIGS. 4A-4E, universal truss unit 133b' defines a quadrilateral structure wherein a plane P1 defined by first member 134c' is disposed at an acute angle A1 relative to a plane P2 defined by second member 134a'. First truss extension unit 133a' is configured to extend outwardly from first side member 136a. First truss extension unit 133a' includes first extender portion 134c" which extends collinear with first member 134c' and second extender portion 134a" which extends collinear with the second member 134a'. Second truss extension unit 133c' is configured to extend outwardly from second side member 136b. Second truss extension unit 133c' includes third extender portion 134c''' which extends collinear with first member 134c' and fourth extender portion 134b which is configured to form an obtuse angle with second member 134a'. As can be seen by truss assemblies 128a-128e, a truss assembly includes the universal truss unit 133b' and any combination of one, none or both of the first truss extension unit 133a' and the second truss extension unit 133c'. Additional profiles may be selected by inverting which of first member 134c' and second member 134a' is configured to mount to the underlying support structure (i.e., compare truss assembly 128a (FIG. 4A) with truss assembly 128b (FIG. 4B) and truss assembly 128d (FIG. 4D) with truss assembly 128e (FIG. 4E)).

Turning once again to FIGS. 4A-4E, truss assembly 128a (as shown in FIG. 4A) may be suitable for structure assemblies 100/100' arranged in a North/South orientation with truss beam 134a lying along horizontal plane H. At least a portion 142 of truss beam 134a within zone 133b is configured to mount to rails 124, 126 as described above. The remaining portion 144 of truss beam 134a (zone 133a) includes a plurality of structural supports 138 secured thereon. Truss beam 134b (zone 133c) lies at an angle with respect to horizontal plane H and includes a plurality of structural supports 138 secured thereon. Truss beam 134c extends across zones 133a, 133b, 133c and interconnects truss beam 134a at South end 146 and truss beam 134b at North end 148. As a result, truss beam 134c is oriented at an angle relative to horizontal plane H such that North end 148 is disposed above South end 146 when truss assembly 128a is secured to mounting substructure 127 (see FIG. 1). Being so arranged, truss assembly 128a may maximize sun exposure at photovoltaic panel arrays 130 mounted on panel supports 140 (see also FIGS. 1 and 2).

As shown in FIG. 4B, truss assembly 128b is equivalent to truss 128a flipped 180° about its horizontal axis. Truss assembly 128b may be suitable for structure assemblies 100/100' arranged in an East/West orientation, with truss beam 134c lying along horizontal plane H. At least a portion 150 of truss beam 134c within zone 133b is configured to mount to rails 124, 126 as described above. The remaining portions 152, 154 of truss beam 134c in zones 133a, 133c include a plurality of structural supports 138 secured thereon. Truss beams 134a and 134b each lie at a different angle with respect to horizontal plane H with truss beam 134a extending across zones 133a, 133b with truss beam 134b covering zone 133c. Truss beam 134c interconnects truss beam 134a at West end 156 and truss beam 134b at East end 158. As a result, truss beam 134a is oriented at an angle relative to horizontal plane H such that West end 156 is exposed to sun to a greater degree/extent that East end 158. Being so arranged, truss assembly 128b may maximize sun exposure at photovoltaic panel arrays 130 mounted on panel supports 140.

Figure 5:
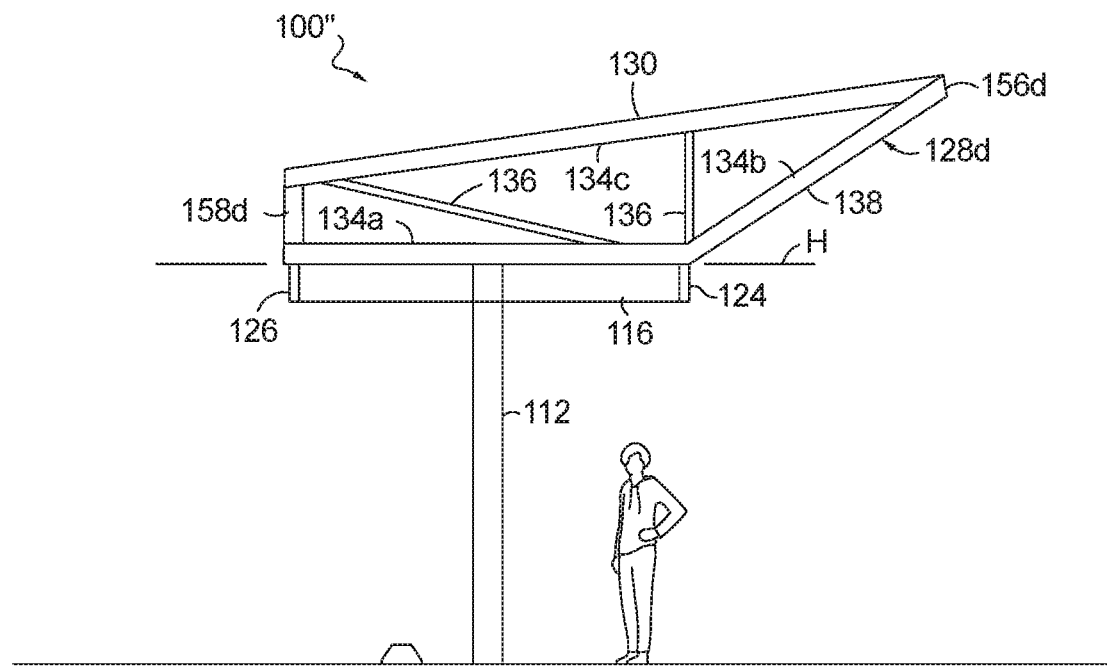
FIG. 5 is a side view of a single lane solar shade structure in accordance with another aspect of the present invention.
Figure 6:
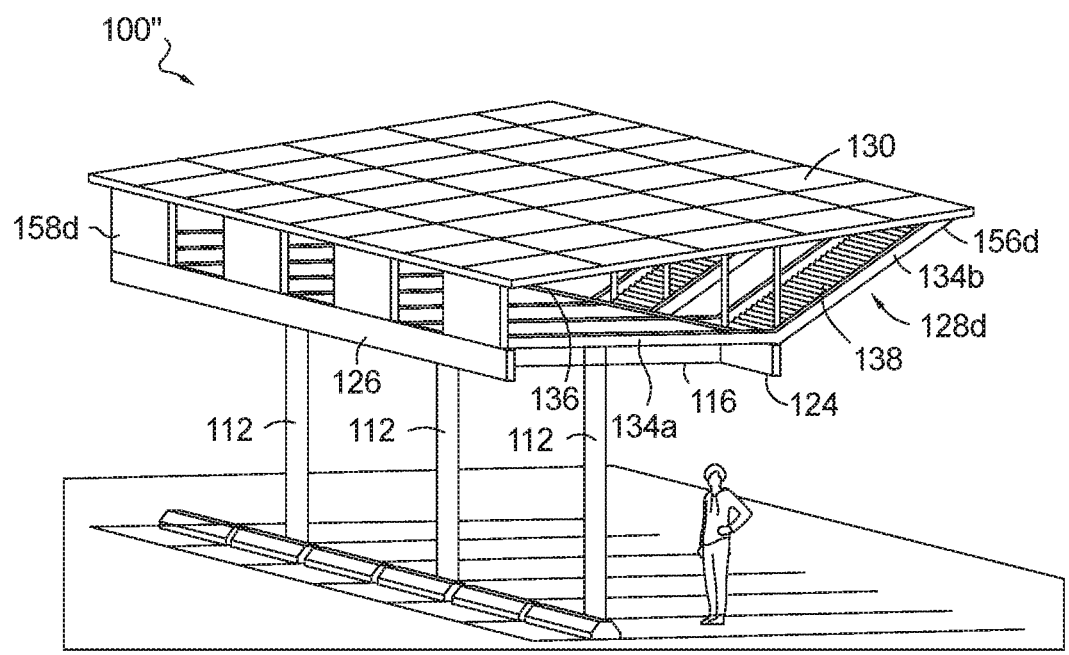
FIG. 6 is a perspective view of the solar shade structure shown in FIG. 5.
Figure 8:
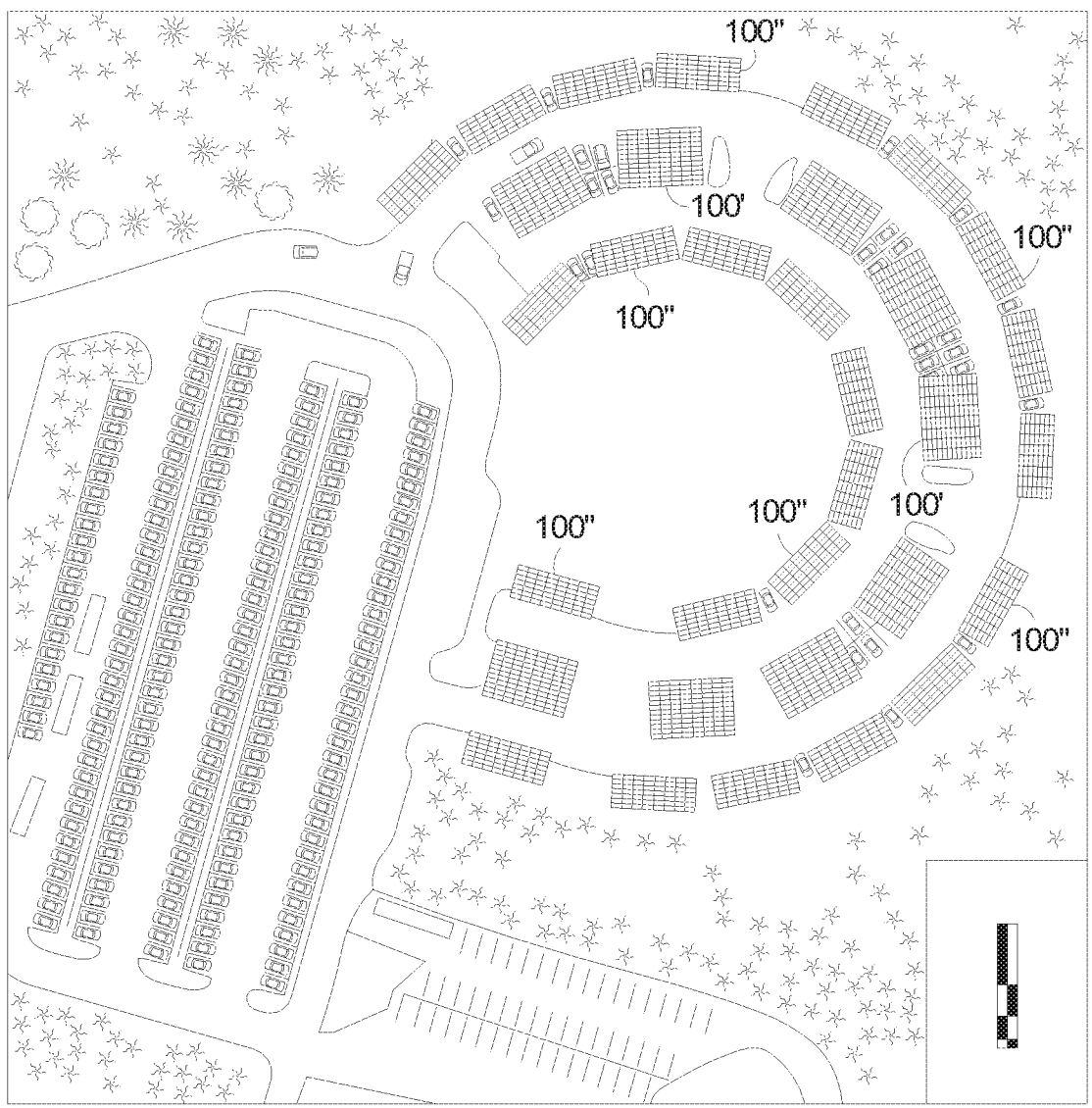
FIG. 8 is an aerial view of a circular- or irregular-shaped parking lot that includes a multiplicity of solar shade structures in accordance with an aspect of the present invention.

FIGS. 4C, 4D and 4E show truss assemblies 128c, 128d, 128e, respectively, which may be suitable for shading a single row of cars, such as along the boundary of a parking lot (see, e.g., assembly 100" in FIGS. 5, 6 and 8). Truss assemblies 128c and 128d may be suitable for structure assemblies 100" arranged in a North/South orientation while truss assemblies 128e may be suitable for structure assemblies 100" arranged in an East/West orientation. As described above with respect to truss assemblies 128a, 128b, the lower surface(s) of truss assemblies 128c, 128d, 128e may include a plurality of structural supports 138 secured thereon while the upper surface(s) of truss assemblies 128c, 128d, 128e may include plurality of panel supports 140. Each truss assembly 128c, 128d, 128e may then be arranged to maximize sun exposure to photovoltaic panel arrays 130 mounted on panel supports 140.

While both truss assemblies 128c, 128d are configured for North/South orientation, these assemblies comprise different structures due to the mounting of each truss assembly 128c, 128d on mounting substructure 127 within zone 133b of the truss assembly. Thus, as shown in FIG. 4C, for those structure assemblies 100" having vehicles parked to the south of zone 133b (south of mounting substructure 127), zone 133a is included and truss beam 134b is omitted. Truss beam 134c is truncated such that truss beam 134c is connected to truss beam 134a via truss beam 134d so as to remove zone 133c from truss assembly 128c. Alternatively, as shown in FIG. 4D, for those structure assemblies 100" having vehicles parked to the north of zone 133b (north of mounting substructure 127), zone 133c is included while zone 133a is removed. Accordingly, truss beam 134b is included and truss beams 134a, 134c are truncated. Truncated truss beam 134c and truss beam 134b each lie at a different angle with respect to horizontal plane H. Truncated truss beam 134c interconnects truss beam 134b at North end 156d and truss beam 134e connects truncated truss beams 134a, 134c along South face 158d so as to remove zone 133a from truss assembly 128d.

For those structure assemblies 100" having vehicles parked in an East/West orientation, at least a portion 150e of truss beam 134c is configured to mount to rails 124, 126 as described above. The remaining portion 154e of truss beam 134c includes a plurality of structural supports 138 secured thereon. Truncated truss beam 134a and truss beam 134b each lie at a different angle with respect to horizontal plane H. Truss beam 134c interconnects truss beam 134b at West end 156e and truss beam 134e connects truss beam 134a with truss beam 134c along East face 158e so as to remove zone 133a from truss assembly 128e.

Figure 7:
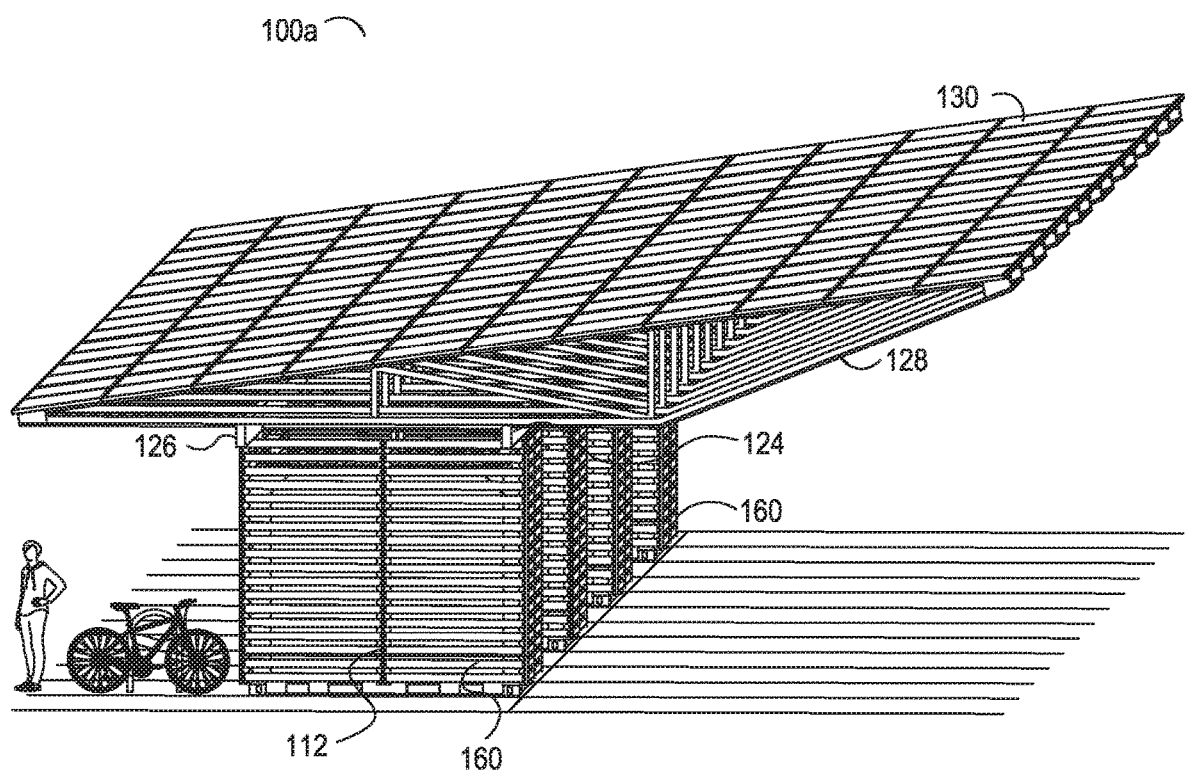
FIG. 7 is a side perspective view of a solar shade structure incorporating bicycle parking in accordance with still another aspect of the present invention.

Turning now to FIG. 7, there is shown an embodiment of a modular shade structure assembly 100a in accordance with another aspect of the present invention. Modular shade structure assembly 110a is similar with respect to modular shade structure assembly 100 described above, but is configured to accommodate both vehicular and bicycle parking. As bicycles are shorter than a vehicle, additional structures 160 may be located about column members 112 while still providing shade to either side of the column members. Additional structures 160 may be prefabricated units having dimensions chosen by the property owner or based upon available space/geography of the assembly location. Structures 160 may accommodate, without limitation thereto, solar/electrical equipment required by modular shade structure assembly 100a and/or commuter or consumer conveniences, such as parking meter payment kiosks, automatic teller machines (ATMS), vending machines, electric vehicle charging stations and the like. Electrical power for these conveniences may be supplied by the photovoltaic panel arrays 130 mounted on modular shade structure assembly 100a.

Figure 9:
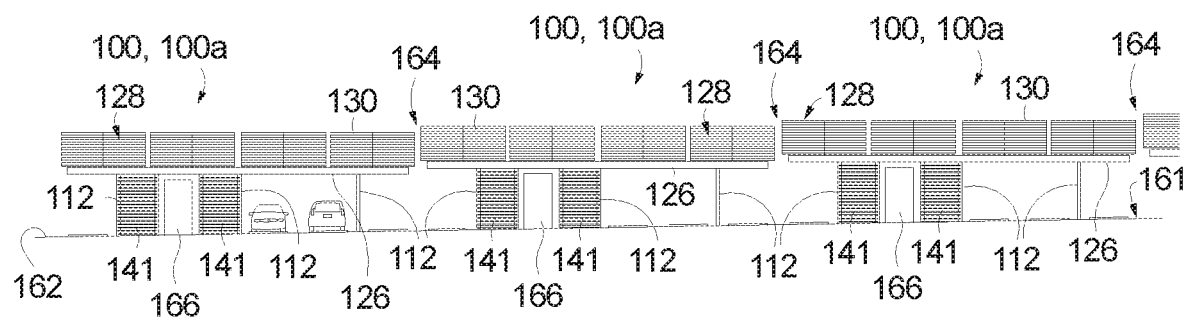
FIG. 9 is a side view of a set of solar shade structures that have been installed to cover or shade the surface of a sloping parking lot surface.

As shown in FIG. 9, modular shade structure assemblies 100, 100a may be used to cover a parking lot 161 that is graded to have a sloping surface 162. A series of modular shade structure assemblies 100, 100a may be mounted adjacent one another with a space 164 therebetween. As a result, parking lot 161 may be covered by modular shade structure assemblies 100, 100a to provide shade while also allowing water run-off and drainage. As further shown in FIG. 9, modular shade structure assemblies 100, 100a may accommodate one or more free-standing commuter or consumer conveniences 166 (such as parking meter payment kiosks, automated teller machines (ATMS), vending machines, electric vehicle charging stations and the like, as discussed above) within the space located between column members 112 and/or vertical screen 141, 143 (see also FIGS. 1 and 2). Modular shade structure assemblies 100, 100a may also contain pedestrian seating elements (not shown) and truss assemblies 128 may include lighting fixtures (not shown) as part of the structure.

From the above discussion, those skilled in the art will appreciate the many advantages offered by the modular shade structure assemblies of the present invention. By way of example and without limitation thereto, the shade structure assemblies of the present invention may be configured to cover a pre-determined number of standard vehicular parking spaces without creating significant projections into the vehicular drive aisles, thereby alleviating or eliminating possible additional building and zoning requirements as well as the potential of accidental impact damage from passing vehicles to the structures or other vehicles. Moreover, the shade structure assemblies of the present invention may be comprised of one or more substructures that can be assembled, on-site, in a planned way taking into account such things as the geometry of the environment with respect to solar radiation, the orientation and shape of the surface, such as a parking lot, and functional realities such as electrical power lines, entry-rights-of-way, pedestrian crosswalks, etc. In this manner, one or more components of the shade structure assemblies may be assembled in a factory setting and/or on the ground adjacent to the project site then moved into position, such as via a crane. This may allow for decreased on-site installation time which minimizes construction time and disruption to the owner of the parking lot. Additionally, the shade structure assemblies may also be embodied as a kit containing pre-manufactured structural components such as foundation/footing elements, column members, beams and rails, truss assemblies, PV modules, and/or commuter or consumer conveniences and the like.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A shade structure assembly comprising:
a) at least two column members arranged vertically with respect to the ground and in spaced parallel relation to one another;
b) a respective horizontal beam secured at a top end of each of the at least two column members, wherein each respective horizontal beam has opposing first and second ends;
c) a pair of rails arranged in spaced parallel relation to one another, wherein a first rail of the pair of rails is secured to the first end of each respective horizontal beam and a second rail of the pair of rails is secured to the second end of each respective horizontal beam; and
d) at least one truss assembly secured to the pair of rails, wherein the at least one truss assembly comprises:
i) at least two truss members arranged in spaced parallel relation to one another, wherein each of the truss members comprises at least three truss beams arranged along a single longitudinal plane;
ii) a plurality of structural supports connecting the at least two truss members along no more than two of the truss beams; and iii) a plurality of panel supports configured to mount a panel array thereto, wherein the plurality of panel supports connect the at least two truss members along no more than two of the truss beams, wherein the panel supports do not connect truss members connected by the structural supports.

2. The assembly in accordance with claim 1, wherein each truss member comprises three truss beams arranged to form an irregular triangle.

3. The assembly in accordance with claim 1 wherein said at least two column members are above-grade mass column members.

4. A shade structure assembly comprising:
a) a column member arranged vertically with respect to the ground;
b) a horizontal beam secured at a top end of said column member, wherein said horizontal beam has opposing first and second ends;
c) a pair of rails arranged in spaced parallel relation to one another, wherein a first rail of the pair of rails is secured to the first end of said horizontal beam and a second rail of the pair of rails is secured to the second end of said horizontal beam; and
d) at least one truss assembly secured to the pair of rails, wherein the at least one truss assembly comprises:
i) at least two truss members arranged in spaced parallel relation to one another, wherein each of the truss members comprises at least three truss beams arranged along a single longitudinal plane;
ii) a plurality of structural supports connecting the at least two truss members along no more than two of the truss beams;
iii) a plurality of panel supports connecting the at least two truss members along no more than two of the truss beams, wherein the panel supports do not connect truss members connected by the structural supports; and
iv) a panel array mounted to the panel supports.

5. The assembly in accordance with claim 4, wherein the panel array comprises one or more photovoltaic panel members.

6. The assembly in accordance with claim 4, wherein each truss member comprises three truss beams arranged to form an irregular triangle.

7. The assembly in accordance with claim 4 wherein said at least two column members are above-grade mass column members.

8. A shade structure assembly comprising
a) a column member arranged vertically with respect to the ground;
b) a horizontal beam secured at a top end of the column member, wherein said horizontal beam has opposing first and second ends;
c) a pair of rails arranged in spaced parallel relation to one another, wherein a first rail of the pair of rails is secured to the first end of said horizontal beam and a second rail of the pair of rails is secured to the second end of said horizontal beam; and
d) at least one truss assembly secured to the pair of rails, wherein the at least one truss assembly comprises:
i) at least two truss members arranged in spaced parallel relation to one another, wherein each of the truss members comprises at least three coplanar truss beams;
ii) a plurality of structural supports connecting the at least two truss members along no more than two of the truss beams; and
iii) a plurality of panel supports configured to mount a panel array thereto, wherein the plurality of panel supports connect the at least two truss members along no more than two of the truss beams, wherein the panel supports do not connect truss members connected by the structural supports.

9. The assembly in accordance with claim 8 wherein said column member is an above-grade mass column member.

10. A modular truss system comprising:
a) a universal truss unit configured to mount to a support structure, wherein the universal truss unit includes a first member, a second member, a first side member and a second side member, all defining a quadrilateral structure wherein a plane defined by the first member is disposed at an acute angle relative to a plane defined by the second member, and wherein said first side member and said second side member are perpendicular to said second member of said universal truss unit;
b) a first truss extension unit configured to extend outwardly from said first side member of said universal truss unit and including a first extender portion extending collinear with the first member of said universal truss unit and a second extender portion extending collinear with the second member of said universal truss unit; and
c) a second truss extension unit configured to extend outwardly from said second side member of said universal truss unit and including a third extender portion extending collinear with the first member of said universal truss unit and a fourth extender portion configured to form an obtuse angle with the second member of said universal truss unit,
wherein a completed truss assembly includes the universal truss unit and none, one or both of the first truss extension unit and the second truss extension unit.

11. The modular truss system of claim 10 wherein the first truss extension unit and first side member define a triangle.

12. The modular truss system of claim 11 wherein the triangle is a right triangle or an irregular triangle.

13. The modular truss system of claim 10 wherein the first truss extension unit, universal truss unit and second truss extension unit arranged along a single longitudinal plane and define a triangle.

14. The modular truss system of claim 13 wherein the triangle is an irregular triangle.

15. The modular truss system of claim 10 wherein a first completed truss assembly comprises the universal truss unit, the first truss extension unit and the second truss extension unit, and wherein the second member of said universal truss unit is configured to mount to the support structure.

16. The modular truss system of claim 10 wherein a second completed truss assembly comprises the universal truss unit, the first truss extension unit and the second truss extension unit, and wherein the first member of said universal truss unit is configured to mount to the support structure.

17. The modular truss system of claim 10 wherein a third completed truss assembly comprises the universal truss unit and the first truss extension unit, and wherein the second member of said universal truss unit is configured to mount to the support structure.

18. The modular truss system of claim 10 wherein a fourth completed truss assembly comprises the universal truss unit and the second truss extension unit, and wherein the second member of said universal truss unit is configured to mount to the support structure.

19. The modular truss system of claim 10 wherein a fifth completed truss assembly comprises the universal truss unit and the second truss extension unit, and wherein the first member of said universal truss unit is configured to mount to the support structure.

20. The assembly in accordance with claim 8 wherein said at least three coplanar truss beams comprises four coplanar truss beams.

\* \* \* \* \*